(12) United States Patent
Gould et al.

(10) Patent No.: US 12,339,826 B2
(45) Date of Patent: Jun. 24, 2025

(54) ON-DEMAND INTEGRATION OF RECORDS WITH DATA CATALOG IDENTIFIERS

(71) Applicant: Ab Initio Technology LLC, Lexington, MA (US)

(72) Inventors: Joel Gould, Arlington, MA (US); Matthew Jonathon Hunter, Sudbury, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 18/491,324

(22) Filed: Oct. 20, 2023

(65) Prior Publication Data

US 2024/0338353 A1    Oct. 10, 2024

Related U.S. Application Data

(60) Provisional application No. 63/494,897, filed on Apr. 7, 2023.

(51) Int. Cl.
| | | |
|---|---|---|
| G06F 16/00 | (2019.01) | |
| G06F 16/21 | (2019.01) | |
| G06F 16/22 | (2019.01) | |

(52) U.S. Cl.
CPC ........ G06F 16/2291 (2019.01); G06F 16/211 (2019.01)

(58) Field of Classification Search
None
See application file for complete search history.

(56) References Cited

U.S. PATENT DOCUMENTS

| | | |
|---|---|---|
| 5,966,072 A | 10/1999 | Stanfill et al. |
| 9,454,578 B2 | 9/2016 | Anzalone et al. |
| 9,959,267 B2 | 5/2018 | Folting et al. |
| 10,831,509 B2 | 11/2020 | Ravid et al. |
| 11,210,285 B2 | 12/2021 | Egenolf et al. |
| 11,423,083 B2 | 8/2022 | Egenolf et al. |
| 2016/0179930 A1* | 6/2016 | Radivojevic .......... G06F 3/0482 707/792 |
| 2017/0052766 A1* | 2/2017 | Garipov ............ G06F 16/24575 |
| 2017/0177446 A1 | 6/2017 | MacLean et al. |
| 2017/0371926 A1 | 12/2017 | Shiran et al. |
| 2019/0361896 A1* | 11/2019 | Brunets .................. G06Q 50/22 |
| 2019/0370263 A1* | 12/2019 | Nucci ................... G06F 16/254 |
| 2020/0050680 A1* | 2/2020 | Murphy ................ G06F 16/212 |
| 2020/0387819 A1* | 12/2020 | Rogynskyy ............ G06N 20/00 |
| 2021/0141838 A1* | 5/2021 | Atallah ............... G06F 16/2228 |
| 2022/0237202 A1* | 7/2022 | Orun ..................... G06F 16/254 |

(Continued)

FOREIGN PATENT DOCUMENTS

WO    WO 2020/076546    4/2020

OTHER PUBLICATIONS

U.S. Appl. No. 13/281,039, Larson et al.

(Continued)

*Primary Examiner* — Hasanul Mobin
(74) *Attorney, Agent, or Firm* — Fish & Richardson P.C.

(57) ABSTRACT

A method implemented by a data processing system for enabling a user to browse a data catalog and select fields from multiple data sources to be integrated into a data profile so that, when a request is received for the data profile, data from those fields can be made available efficiently and immediately.

24 Claims, 12 Drawing Sheets

(56) References Cited

U.S. PATENT DOCUMENTS

2022/0391380 A1* 12/2022 Raghavan ............... G06F 21/31
2024/0184989 A1*  6/2024 Mann .................... G06F 40/166
2024/0202212 A1*  6/2024 Vidal ................. G06F 16/2455
2024/0338353 A1* 10/2024 Gould .................. G06F 16/211

OTHER PUBLICATIONS

U.S. Appl. No. 15/993,284, Dickie.
Broadcom [online], "Adding/Modifying Virtual Fields," retrieved on May 26, 2022, retrieved from URL<https://techdocs.broadcom.com/us/en/ca-enterprise-software/it-operations-management/ca-2e/8-7/defining-ca-2e-data-models/maintaining-your-data-model/adding-modifying-virtual-fields.html>, 3 pages.
Dreamio—AWS Workshop [online], "Editing a Virtual Dataset," retrieved on May 26, 2022, retrieved from URL<https://dremio.awsworkshop.io/50-create-virtual-datasets/504-edit-vitual-dataset.html>, 3 pages.
Tibco [online], "Anything 360," retrieved on Apr. 8, 2022, retrieved from URL<https://www.tibco.com/solutions/anything-360]>, 6 pages.
Towards Data Science [online], "The Anatomy of an Active Metadata Platform," Aug. 12, 2021, retrieved on Apr. 8, 2022, retrieved from URL<https://towardsdatascience.com/the-anatomy-of-an-active-metadata-platform-13473091ad0d>, 16 pages.
International Search Report and Written Opinion in International Appln. No. PCT/US2024/023227, mailed on Jul. 8, 2024, 16 pages.

* cited by examiner

100

```
┌─────────────────────────────────────────────────────────────────────┐
│ Store, in memory, one or more attribute records, with each of the   │
│ one or more attribute records specifying one or more attributes of  │
│ an entity, and with each of the one or more attribute records being │
│ associated with one or more keys                              102   │
└─────────────────────────────────────────────────────────────────────┘
                                 │
                                 ▼
┌─────────────────────────────────────────────────────────────────────┐
│ Access a data catalog that stores identifiers representing fields,  │
│ with the fields being candidates for inclusion in the one or more   │
│ attribute records                                             103   │
└─────────────────────────────────────────────────────────────────────┘
                                 │
                                 ▼
┌─────────────────────────────────────────────────────────────────────┐
│ Receive selection data that specifies one or more identifiers       │
│ representing one or more fields selected for inclusion in the one   │
│ or more attribute records                                     104   │
└─────────────────────────────────────────────────────────────────────┘
                                 │
                                 ▼
┌─────────────────────────────────────────────────────────────────────┐
│ Identify the one or more fields represented by the one or more      │
│ identifiers and identifying one or more data sources of the one     │
│ or more fields                                                105   │
└─────────────────────────────────────────────────────────────────────┘
                                 │
                                 ▼
┌─────────────────────────────────────────────────────────────────────┐
│ Access the one or more data sources to retrieve data associated     │
│ with the one or more identified fields                              │
│                                                               106   │
└─────────────────────────────────────────────────────────────────────┘
                                 │
                                 ▼
┌─────────────────────────────────────────────────────────────────────┐
│ Generate a data structure that specifies: the one or more keys; and │
│ for each key of the one or more keys, the retrieved data      107   │
└─────────────────────────────────────────────────────────────────────┘
                                 │
                                 ▼
┌─────────────────────────────────────────────────────────────────────┐
│ Store, in a hardware storage device, the data structure             │
│                                                               108   │
└─────────────────────────────────────────────────────────────────────┘
```

FIG. 5

ON-DEMAND INTEGRATION OF RECORDS WITH DATA CATALOG IDENTIFIERS

CLAIM OF PRIORITY

This application claims priority under 35 U.S.C. § 119 (e) to U.S. Patent Application Ser. No. 63/494,897, filed on Apr. 7, 2023, the entire contents of which are hereby incorporated by reference.

TECHNICAL FIELD

This disclosure relates to techniques for enabling a user to select items from a data catalog to be integrated into a data profile so that, when a request is received for the data profile, data from those fields can be made available efficiently and immediately.

BACKGROUND

Modern data processing systems manage vast amounts of data within an enterprise. A large enterprise, for example, may have millions of datasets. These datasets can support multiple aspects of the operation of the enterprise. Complex data processing systems typically process data in multiple stages, with the results produced by one stage being fed into the next stage. The overall flow of information through such systems may be described in terms of a directed dataflow graph, with nodes or vertices in the graph representing components (either data files or processes), and the links or "edges" in the graph indicating flows of data between the components. A system for executing such graph-based computations is described in U.S. Pat. No. 5,966,072, titled "Executing Computations Expressed as Graphs," incorporated herein by reference.

SUMMARY

In a general aspect 1, described is a method implemented by a data processing system for enabling a user to browse a data catalog and select fields from multiple data sources to be integrated into an data profile so that, when a request is received for the data profile, data from those fields is made available, including: storing, in memory, one or more data profiles, with each of the one or more data profiles specifying one or more data of an entity, and with each of the one or more data profiles being associated with one or more keys; accessing a data catalog that stores identifiers representing fields of datasets in one or more data sources, with the fields being candidates for inclusion in the one or more data profiles; based on accessing the data catalog, receiving selection data that specifies one or more identifiers representing one or more fields selected for inclusion in the one or more data profiles; based on the selection data, identifying the one or more fields represented by the one or more identifiers and identifying one or more data sources of the one or more identified fields; accessing the one or more data sources to retrieve data associated with the one or more identified fields; based on the retrieved data, generating a data structure that specifies: the one or more keys; and for each key of the one or more keys, the retrieved data and the one or more identifiers representing the one or more identified fields; and storing, in a hardware storage device, the data structure.

In an aspect 2 according to aspect 1, wherein the data from those fields is made available efficiently and immediately.

In an aspect 3 according to any one of aspects 1 to 2, further including: receiving a request for a data profile associated with a given key of the one or more keys; responsive to the request, retrieving, from the data structure, the one or more identifiers and one or more items of the retrieved data associated with the given key; accessing, in the memory, the data profile associated with the given key; updating the data profile associated with the given key, with the data profile being updated with the one or more identifiers and the one or more items of the retrieved data associated with the given key; and storing, in the memory, the updated data profile.

In an aspect 4 according to any one of aspects 1 to 3, further including: causing rendering of a graphical user interface that when rendered in a display device displays one or more first visual representations of the one or more identifiers and one or more controls, selection of which requests to add a field represented by a given identifier to a data profile.

In an aspect 5 according to any one of aspects 1 to 4, further including: generating an executable program to retrieve, from the one or more data sources, and join together the data associated with the one or more identified fields; and executing the executable program to generate the data structure based on the retrieved and joined data.

In an aspect 6 according to any one of aspects 1 to 5, wherein generating the executable program includes: accessing a template of an executable program, wherein the template specifies to access a plurality of data sources represented in the data catalog; and updating the template such that the template is configured to only access one or more data sources storing data associated with the one or more identified fields; wherein the updating improves a run-time efficiency of an executable program generated from the updated template, relative to a run-time efficiency of an executable program generated from the template.

In an aspect 7 according to any one of aspects 1 to 6, wherein updating includes adding one or more filter operations such that the executable program, when executed, only joins data associated with the one or more identified fields.

In an aspect 8 according to any one of aspects 1 to 7, wherein updating includes omitting one or more data access operations for one or more data sources storing data associated with one or more fields that are different from the one or more identified fields.

In a general aspect 9, a data processing system configured for enabling a user to browse a data catalog and select fields from multiple data sources to be integrated into an attribute record so that, when a request is received for the attribute record, data from those fields is made available, the data processing system including: one or more processors; and a memory device storing instructions that, when executed by the one or more processors, cause the one or more processors to perform operations including: storing, in a memory, one or more attribute records, with each of the one or more attribute records specifying one or more attributes of an entity, and with each of the one or more attribute records being associated with one or more keys; accessing a data catalog that stores identifiers representing fields of datasets in one or more data sources, with the fields being candidates for inclusion in the one or more attribute records; based on accessing the data catalog, receiving selection data that specifies one or more identifiers representing one or more fields selected for inclusion in the one or more attribute records; based on the selection data, identifying the one or more fields represented by the one or more identifiers and identifying one or more data sources of the one or more identified fields; accessing the one or more data sources to retrieve data associated with the one or more identified fields; based on the retrieved data, generating a data structure that specifies: the one or more keys; and for each key of the one or more keys, the retrieved data and the one or more identifiers representing the one or more identified fields; and storing, in a hardware storage device, the data structure.

In an aspect 10 according to aspect 9, wherein the data from those fields is made available efficiently and immediately.

In an aspect 11 according to any one of aspects 9 to 10, the operations further including: receiving a request for an attribute record associated with a given key of the one or more keys; responsive to the request, retrieving, from the data structure, the one or more identifiers and one or more items of the retrieved data associated with the given key; accessing, in the memory, the attribute record associated with the given key; updating the attribute record associated with the given key, with the attribute record being updated with the one or more identifiers and the one or more items of the retrieved data associated with the given key; and storing, in the memory, the updated attribute record.

In an aspect 12 according to any one of aspects 9 to 11, the operations further including: causing rendering of a graphical user interface that when rendered in a display device displays one or more first visual representations of the one or more identifiers and one or more controls, selection of which requests to add a field represented by a given identifier to an attribute record.

In an aspect 13 according to any one of aspects 9 to 12, the operations further including: generating an executable program to retrieve, from the one or more data sources, and join together the data associated with the one or more identified fields; and executing the executable program to generate the data structure based on the retrieved and joined data.

In an aspect 14 according to any one of aspects 9 to 13, wherein generating the executable program includes: accessing a template of an executable program, wherein the template specifies to access a plurality of data sources represented in the data catalog; and updating the template such that the template is configured to only access one or more data sources storing data associated with the one or more identified fields, wherein the updating improves a run-time efficiency of an executable program generated from the updated template, relative to a run-time efficiency of an executable program generated from the template.

In an aspect 15 according to any one of aspects 9 to 14, wherein updating includes adding one or more filter operations such that the executable program, when executed, only joins data associated with the one or more identified fields.

In an aspect 16 according to any one of aspects 9 to 15, wherein updating includes omitting one or more data access operations for one or more data sources storing data associated with one or more fields that are different from the one or more identified fields.

In a general aspect 17, one or more non-transitory computer readable media storing instructions for being executed by one or more processors of a data processing system, the instructions configured for enabling a user to browse a data catalog and select fields from multiple data sources to be integrated into an attribute record so that, when a request is received for the attribute record, data from those fields is made available, the instructions causing, when executed, the one or more processors to perform operations including: storing, in a memory, one or more attribute records, with each of the one or more attribute records specifying one or more attributes of an entity, and with each of the one or more attribute records being associated with one or more keys; accessing a data catalog that stores identifiers representing fields of datasets in one or more data sources, with the fields being candidates for inclusion in the one or more attribute records; based on accessing the data catalog, receiving selection data that specifies one or more identifiers representing one or more fields selected for inclusion in the one or more attribute records; based on the selection data, identifying the one or more fields represented by the one or more identifiers and identifying one or more data sources of the one or more identified fields; accessing the one or more data sources to retrieve data associated with the one or more identified fields; based on the retrieved data, generating a data structure that specifies: the one or more keys; and for each key of the one or more keys, the retrieved data and the one or more identifiers representing the one or more identified fields; and storing, in a hardware storage device, the data structure.

In an aspect 18 according to aspect 17, wherein the data from those fields is made available efficiently and immediately.

In an aspect 19 according to any one of aspects 17 to 18, the operations further including: receiving a request for an attribute record associated with a given key of the one or more keys; responsive to the request, retrieving, from the data structure, the one or more identifiers and one or more items of the retrieved data associated with the given key; accessing, in the memory, the attribute record associated with the given key; updating the attribute record associated with the given key, with the attribute record being updated with the one or more identifiers and the one or more items of the retrieved data associated with the given key; and storing, in the memory, the updated attribute record.

In an aspect 20 according to any one of aspects 17 to 19, the operations further including: causing rendering of a graphical user interface that when rendered in a display device displays one or more first visual representations of the one or more identifiers and one or more controls, selection of which requests to add a field represented by a given identifier to an attribute record.

In an aspect 21 according to any one of aspects 17 to 20, the operations further including: generating an executable program to retrieve, from the one or more data sources, and join together the data associated with the one or more identified fields; and executing the executable program to generate the data structure based on the retrieved and joined data.

In an aspect 22 according to any one of aspects 17 to 21, wherein generating the executable program includes: accessing a template of an executable program, wherein the template specifies to access a plurality of data sources represented in the data catalog; and updating the template such that the template is configured to only access one or more data sources storing data associated with the one or more identified fields, wherein the updating improves a run-time efficiency of an executable program generated from the updated template, relative to a run-time efficiency of an executable program generated from the template.

In an aspect 23 according to any one of aspects 17 to 22, wherein updating includes adding one or more filter operations such that the executable program, when executed, only joins data associated with the one or more identified fields.

In an aspect 24 according to any one of aspects 17 to 23, wherein updating includes omitting one or more data access operations for one or more data sources storing data associated with one or more fields that are different from the one or more identified fields.

One or more of the above aspects may provide one or more of the following advantages. The techniques described herein provide an efficiency gain in updating previously generated and stored data profiles with new fields, e.g., based on fields that are indexed in a data catalog. In an example, there are thousands of data profiles. For each of these profiles to be updated with additional selected fields would waste computational and memory resources. This is because thousands of profiles would need to be updated and those updated profiles stored, when—in fact—only one or two of these profiles (with the new fields) may ever be requested or used. To address this computational inefficiency, the techniques described herein generate a look-up (or other data structure) with values for the specified fields, for each key for which the system stores a profile. In some examples, this look-up file may be stored in memory or on disk. Then, at the time when there is a request for a profile associated with a particular key, the system described herein lookups—in the lookup file, the values of the fields associated with the particular key and retrieves those values. The system described herein integrates the retrieved values of the fields with the profile—on demand. The system performs the integration, e.g., by updating the profile (for the particular key) to include the retrieved values. It is more computationally efficient to generate a look-up file with all the values of the fields across the keys for which the system stores profiles, rather than updating all the profiles with the values. This is because it requires less computing power and computing operations to generate a look-up file, than merging values with thousands of data records.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is a flow diagram of an example process for integrating a data catalog with data profiles.

DETAILED DESCRIPTION

Figure 1:
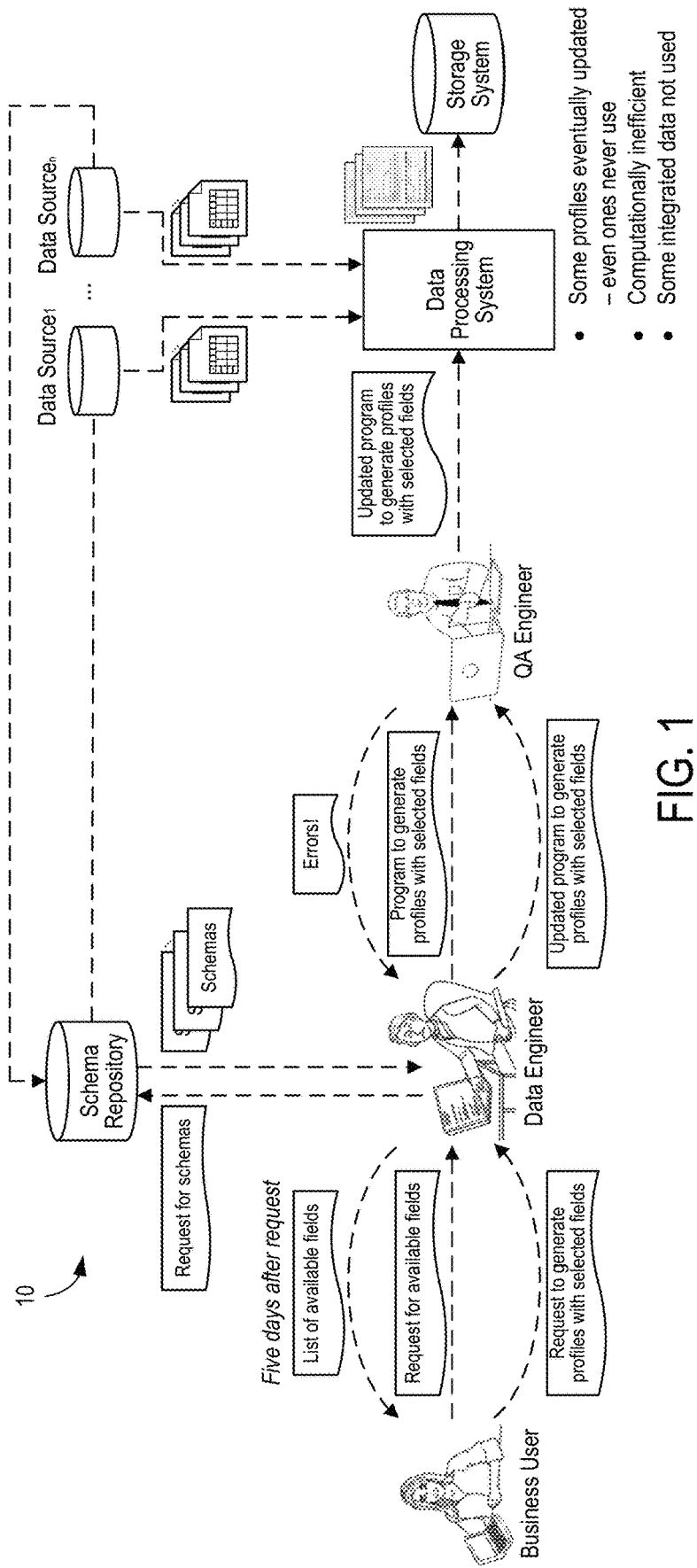
FIG. 1 is a block diagram of a system.

Referring to FIG. 1, the prior art system 10 is shown. In this example, a business user may want to update a customer profile with data that is available in a data catalog, as described in U.S. patent application Ser. No. 13/281,039, titled "Managing Data Set Objections," the entire contents of which are incorporated herein by reference.

But, the business user does not know what data is available and would be a candidate for use and updating the profile. So, the business user sends to a data engineer a request for all available fields. In this example, the data engineer has to spend a lot of time requesting schemas from a schema repository, receiving the schemas, ultimately analyzing most schemas, and trying to understand all the data that would be available through data catalog. Finally, the data engineer may send a list of available fields back to the business user, but this may take five days or even longer. The business user may then be able to review these fields, and finally request to generate profiles with the selected fields and send this request to the data engineer. In turn, the data engineer may program or generate a program to generate profiles with the selected fields. The data engineer passes this program to QA engineer who may identify errors and, in turn, send the data engineer a notification of those errors. In turn, the data engineer will have to update the program to generate the files with the selected fields. This debugging process could go on indefinitely. But, in this example, at some point the program is good enough that it can be executed, and the data engineer may send to a data processing system the updated program to generate the profiles with the selected fields. In this example, the data processing system may execute that program and retrieve data from various sources and updating files. But, this process is extraordinarily memory and processing inefficient because all of the profiles of the system are going to be updated, even the ones that are never used. For example, the storage system may store 10,000 profiles. In this example, if the business user wants to add five fields to those profiles, the data processing system will update all 10,000 profiles with the five fields even if in use only one or two of those profiles is actually ever needed. So, this process is computationally inefficient because some of the integrated data [the data that is being used to update the profiles] is never actually used.

Figure 2:
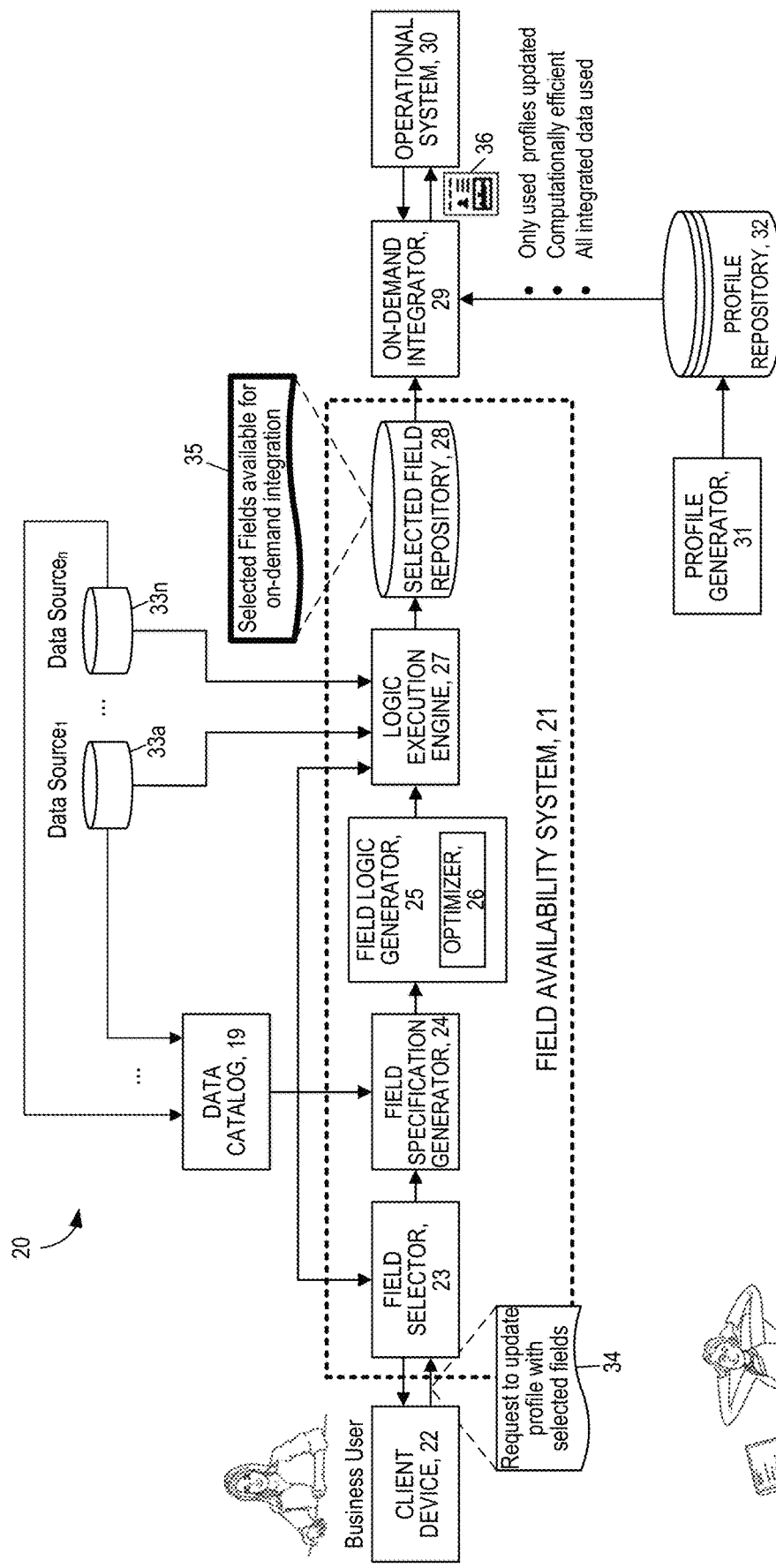
FIG. 2 is a diagram of a system for integrating a data catalog with a data profile.

Referring to FIG. 2, system 20 is shown for efficiently and automatically determining which fields are available from a data catalog to be used in updating a data profile, and to then update profiles with selected fields, only when that profile is actually requested for years. In this example, system 20 includes field availability system 21. Generally, field availability system 21 determines which fields in data catalog 19 are candidates for inclusion in the user profile. In this example, field availability system 21 includes field selector 23, which enables a user to select which fields to include in a profile. Field availability system 21 also includes field specification generator 24, which generates a specification to join together those selected fields. Generally, a specification includes logic, a computer program, or other instructions that specify how to output or achieve a determined result. Field availability system 21 also includes field logic generator 25 and optimizer 26. An optimizer is described in U.S. patent application Ser. No. 15/993,284, titled "Systems and Methods for Dataflow Graph Optimization," the entire contents of which are incorporated herein by reference.

In this example, field logic generator is configured to generate a program that is needed to actually access data from all the selected fields and join them together, for example, in a wide record. Field logic generator 25 includes optimizer 26, which includes rules that increase, or otherwise optimize the efficiency of a computer program (for example, one that is generated by field logic generator). Field availability system 21 includes logic execution engine 27, which executes the logic generated from field logic generator 25. Field availability system 21 also includes selected field repository 28, which stores a look up file or other type of data file, data record, or other data structure with data for the selected fields. System 20 also includes on-demand integrator 29, which is configured to integrate a profile of a specific user with fields for that specific user, as they are stored in the selected field repository 28. System 20 also includes operational system 30, which sends a request to on-demand integrator 29 for an integrated profile, and also receives an integrated profile responsive to that request. System 20 also includes profile generator which is configured to generate user profiles in the first place. System 20 also includes profile repository 32, which is configured to store profiles generated by profile generator 31 and to also send those profiles to on-demand integrator 29. System 20 also includes the data sources 33*a* . . . 33*n*. In this example, data sources 33*a* . . . 33*n* sends to data catalog 19 technical metadata or other kinds of metadata specifying the data sets that are included in these data sources and the data fields of each of these data sets.

In this example, field selector 23 sends to client device 22 information that when rendered on client device 22, displays one or more visual representations of fields that are candidates for inclusion in a user profile. In this example, client device 22 sends request 34 to field selector 23. Request 34 is a request to update profile with selected fields. Based on the fields that are specified (e.g. by a user and/or by an automated process that specifies fields in accordance with user-input criteria) or selected to be included in the user profile, field availability system 21 generates code and/or logic to retrieve values of these fields, and force them in a wide record, or look up file, or as data 35. In this example, data 35 includes values of selected fields that are available for integration. One operational system 30 sends on-demand integrator 29 a request for the integrated profile, the on-demand integrator only needs to retrieve from selected field repository 28 values of fields that are associated with a key specified in the request from operational system 30. In this example, when operational systems 30 requests an integrated profile, operational system 30 specifies a key that is associated with the profile or that otherwise uniquely identifies the profile. In this example, on-demand integrator 29 only needs to request from selected field repository 28 fields that are associated with that key. Once on-demand integrator 29 has retrieved fields and values of those fields that are associated with that key, for example, from data 35, on-demand integrator 29 can generate integrated profile 36. In this example, integrated profile 36 is computationally efficient because it only includes updates for profiles that are actually being used and all of the integrated data is actually being used.

Figure 3A:
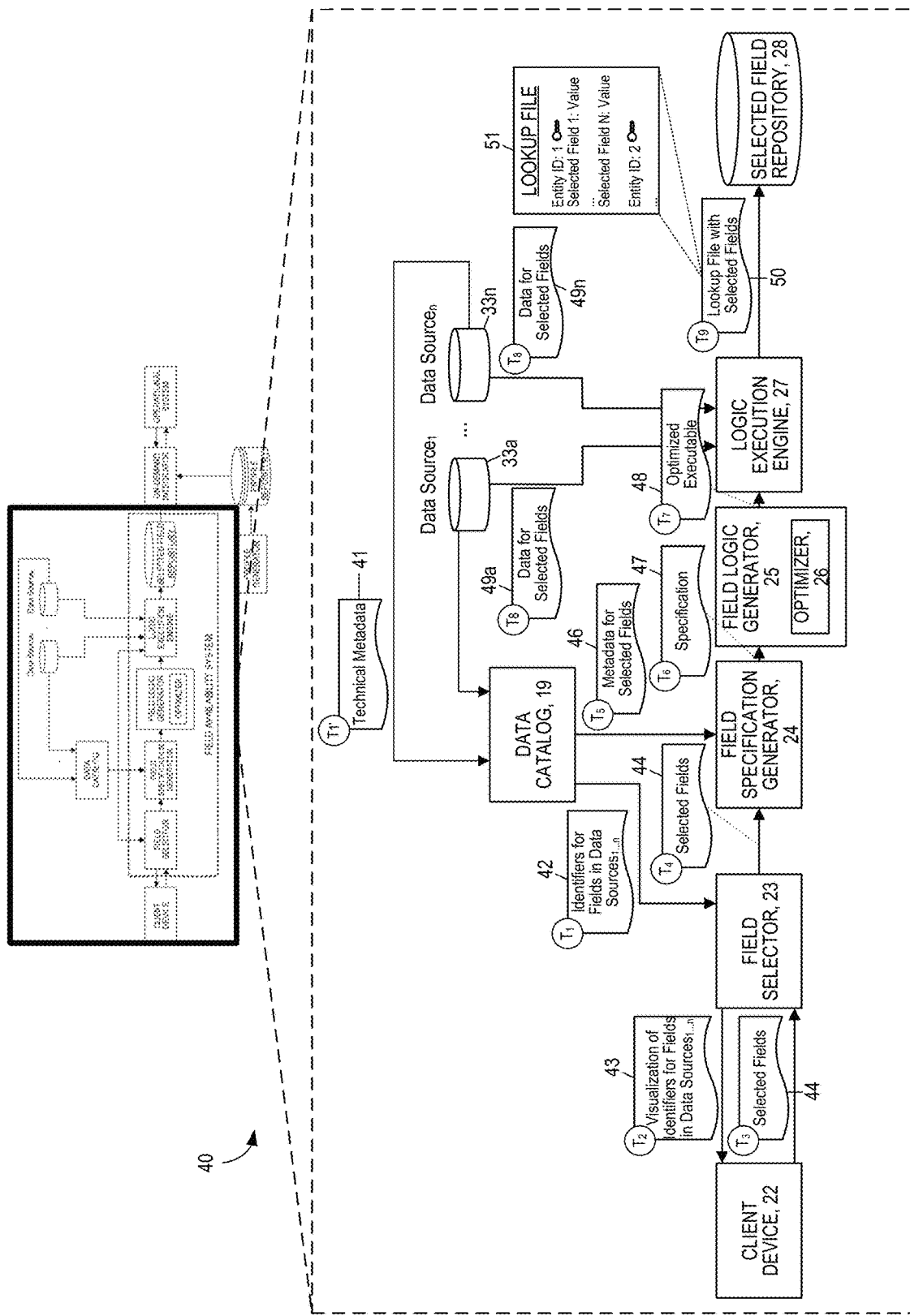
FIGS. 3A and 3B are diagrams of the system of FIG. 2 in stages.

Referring to FIG. 3A, environment 40 shows actions that are performed in generating a lookup file for storage in selected field repository 28. In this example, data sources 33*a* . . . 33*n* send technical metadata 41 to data catalog 19. In turn, data catalog 19 transmits to field selector 23 identifiers 42 for fields in those data sources 33*a* . . . 33*n*. These identifiers may include field names for example. Field selector 23 sends visualization 43 to client device 22. Visualization 43 is a visualization of identifiers for fields in data sources 33*a* . . . 33*n*. Generally, and without limitation, this visualization may be data for providing a visualization when that data is rendered on client device 22.

Client device 22 sends selected field data 44 to field selector 23. Selected field data 44 specifies which fields have been selected for inclusion in user profiles. Field selector 23 sends selected field data to field specification generator 24. In turn, field specification generator 24 requests from data catalog the metadata for those selected fields and receives this requested metadata 46. This requested metadata includes data specifying which data sources and/or data sets store or otherwise have the selected fields. Based on the metadata 46, field specification generator 24 generates a specification 47. Using specification 47, field logic generator generates a graph or optimized executable logic 48. In this example, the specification 47 specifies which actions need to be implemented to retrieve and join together the selected fields. The executable, or the logic that is generated specifies the code or executable computer instructions for actually doing so. Logic execution engine 27 executes the optimized executable 48. By doing so, logic execution engine 27 receives data 49*a* . . . 49*n* for the selected fields from data sources 33*a* . . . 33*n*. Using the received data and based on execution of the optimized executable 48, logic execution engine 27 outputs lookup file 50 with the selected fields. View 51 of lookup file 50 is shown. View 51 illustrates that lookup file 50 includes keys and for each key lookup file 50 includes values for the selected fields. Logic execution engine 27 transmits lookup file 50 to selected field repository 28 for storage in selected field repository 28.

Figure 3B:
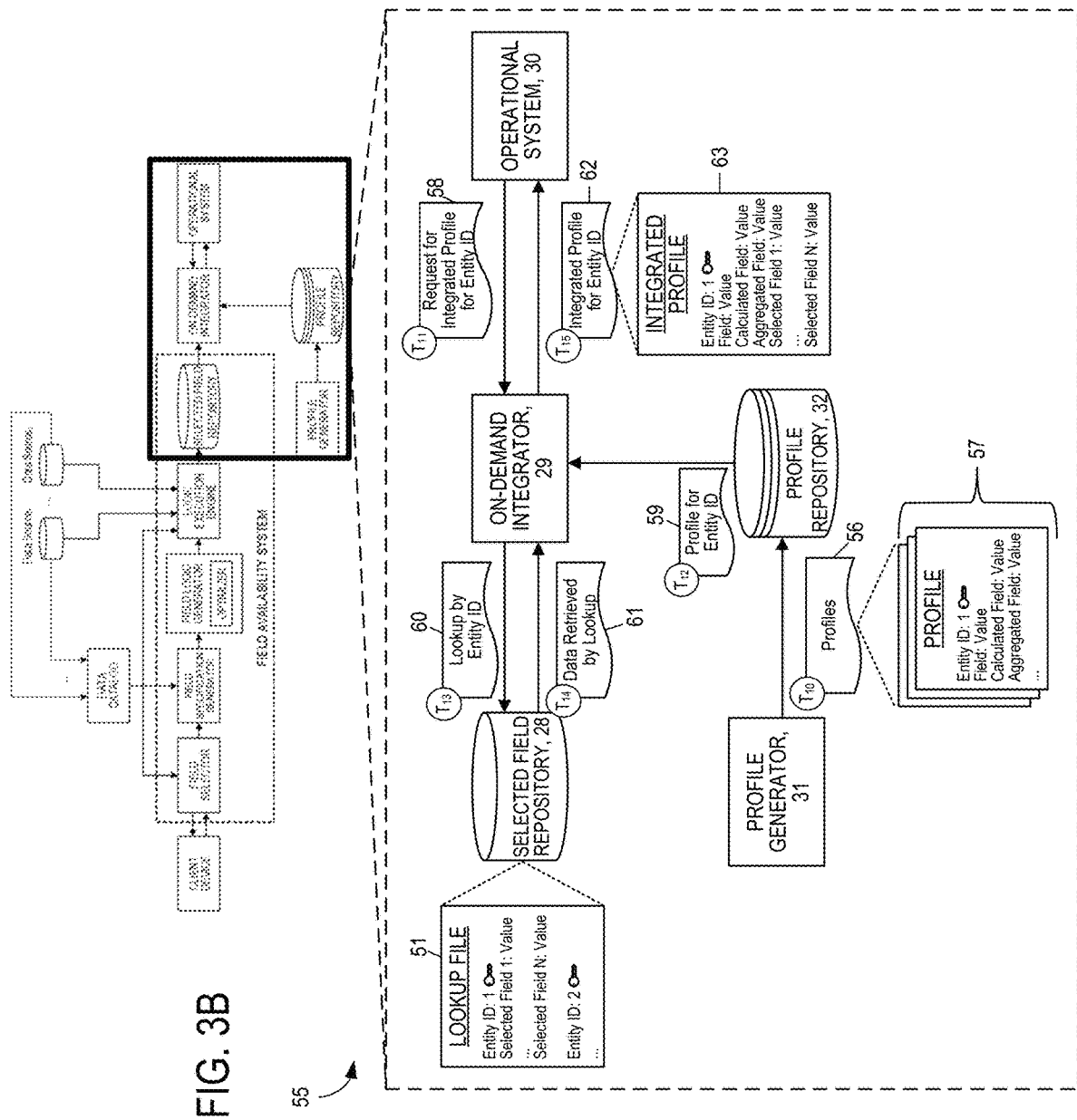

Referring to FIG. 3B, view 55 illustrates real time functionality of creating an integrated profile. In this example, profile generator 31 generates profiles 56, as shown by view 57. Profile generator 31 transmits profiles 56 to profile repository.

Operational system 30 transmits request 58 to on-demand integrator 29. Request 58 is a request for an integrated profile for a particular entity ID. Responsive to the request, on-demand integrator 29 looks up file 50 [as shown by view 51] the selected field values associated with the entity ID specified in request 58. Selected field repository 28 transmits to on-demand integrator 29 data 61 retrieved by the lookup. In this example, data 61 includes the values of the selected field better associated with the entity ID specified in request 58. On-demand integrator 29 now needs the profile for which the integration is going to be performed. As such, profile repository 32 transmits profile 59 to on-demand integrator 29. Profile 59 is a profile for the entity ID specified in request 58. On-demand integrates retrieved data 61 with profile 59 to generate integrated profile 62 as shown by view 63. In this example, integrated profile 62 includes profile 59, but is also updated with the data that specifies the values of the selected fields for the entity ID included in request 58. On-demand integrator 29 transmits integrated profile 62 to operational system 30.

Figure 4A:
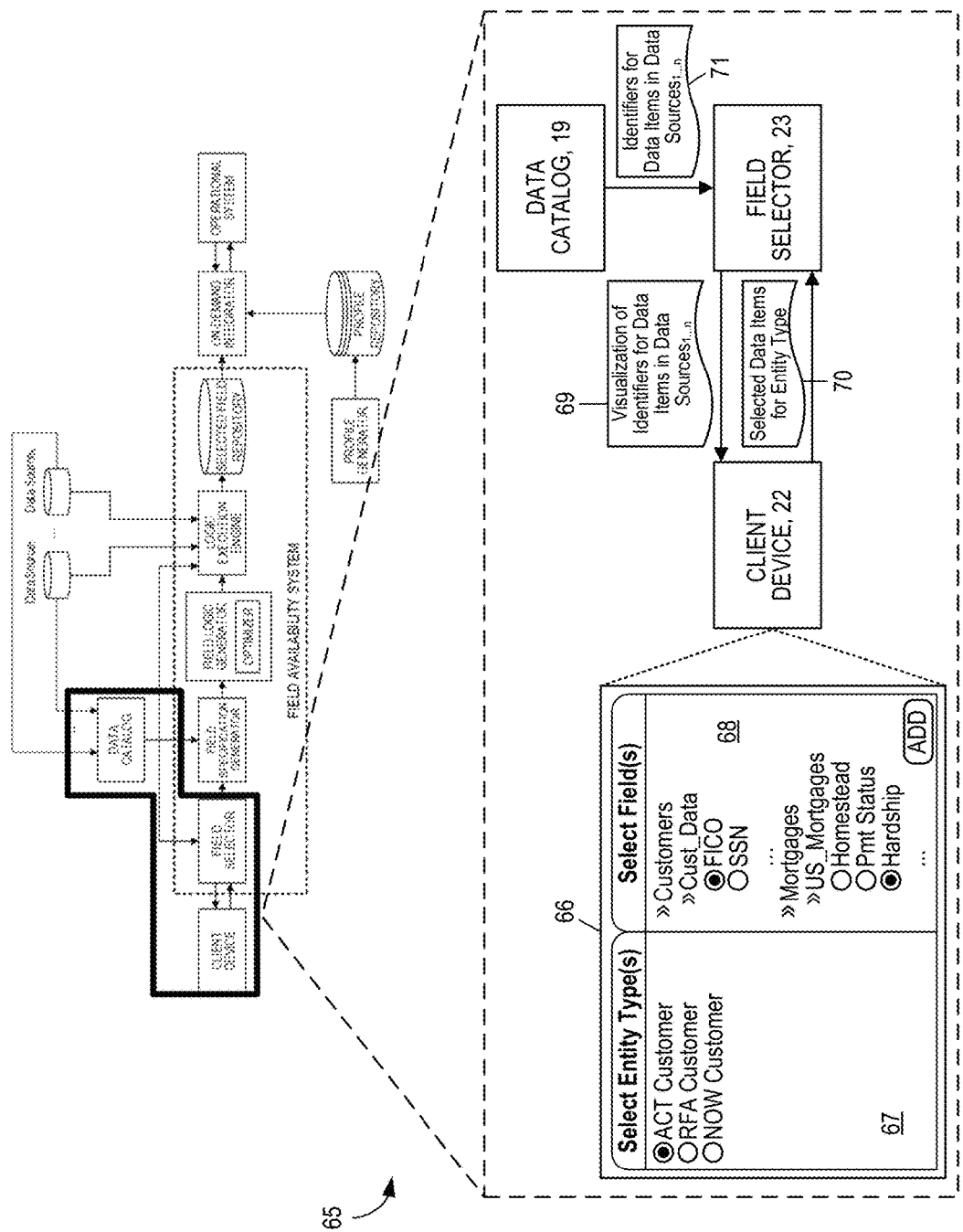
FIGS. 4A-4F are diagrams of the system of FIG. 2 in stages.

Referring to FIG. 4A, view 65 is shown to illustrate how fields are selected for potential inclusion in an integrated profile. In this example, client device 22 renders graphical user interface 66. However, before client device 22 can render graphical user interface 66, data catalog 19 transmits identifiers to field selector 23. In this example, identifiers 71 are for data items in data sources 33*a* . . . 33*n*. Based on identifiers 71, field selector 23 transmits to client device 22, data for a visualization of identifiers for these data items. This transmitted data is referred to as visualization data 69. Based on visualization data 69, client device 22 renders graphical user interface 66. In this example, graphical user interface 66 includes portion 67, which enables the user to select which entity type they want to view the fields for. An entity type is an organizational concept used by a data catalog to group or otherwise cluster together data that is related. Once an entity type is selected, portion 68, a graphical user interface 66 enables a user to select which fields they want to be included in the user profiles. In this example, two fields are selected. The field of FICO and the field of hardship. Once the required fields been selected, client device 22 sends selection data 70 to field selector 23. Selection data 70 specifies the data items for a particular entity type that are to be included in the user profiles.

Figure 4B:
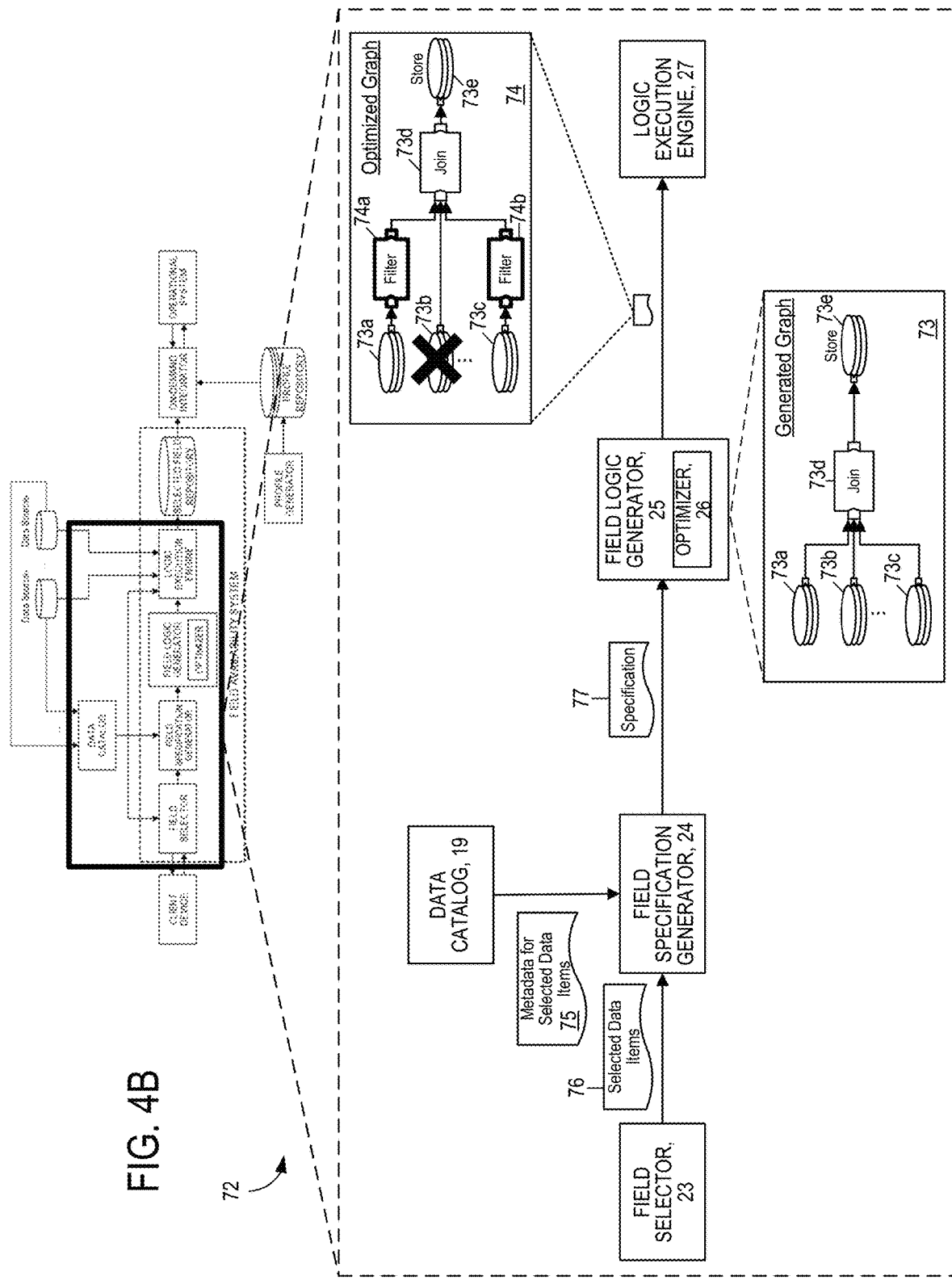

Referring to FIG. 4B, view 72 is shown of generating optimized logic to join together selected fields. In this example, field selector 23 transmits selected data items 76 to field specification generator 24. Selected data items 76 specify which data items have been selected, for example, specify which fields been selected. In this example, selected data items 76 is the same as selected data items 70 (as shown in FIG. 4A). Field specification generator 24 also retrieves metadata for the selected data items from data catalog 19. In this example, metadata 75 includes data specifying which data sources and which data sets have the selected fields or data items. Based on selected data items 76 and metadata 75, field specification generator 24 generate specifications 77. In this example, field specification generator 24 may include a template to access various data sources and join them together. In this example, field specification generator 24 generate specifications 77 by populating fields of the template based on metadata 75. For example, field specification generator 24 may populate the template by specifying which data sources are required to retrieve the selected fields. Based on specification 77, field logic generator 25 generates logic to retrieve values or data found in the selected field. In this example, field logic generator 25 generates graph 73. Graph 73 includes components 73a-73e. Prior to execution of graph 73, optimizer 26 optimizes graph 73 to produce optimized graph 74. In this example, optimized graph 74 is a version of graph 73 in which component 73b is removed and component 74a, 74b are added to improve efficiency. In this example, the selected fields (as shown in portion 68 of graphical user interface 66) are only two fields of FICO and hardship. As such, not all the data sources are required, which is why component 73b has been deleted. Additionally, for each data source (i.e., customers and mortgages) not all the data is required, only the field pertaining to FICO and hardship. To achieve this, filter components 74a, 74b are used for each data source to filter the fields to only the fields matching up to responding to the selected data items and selected data items 76.

Figure 4C:
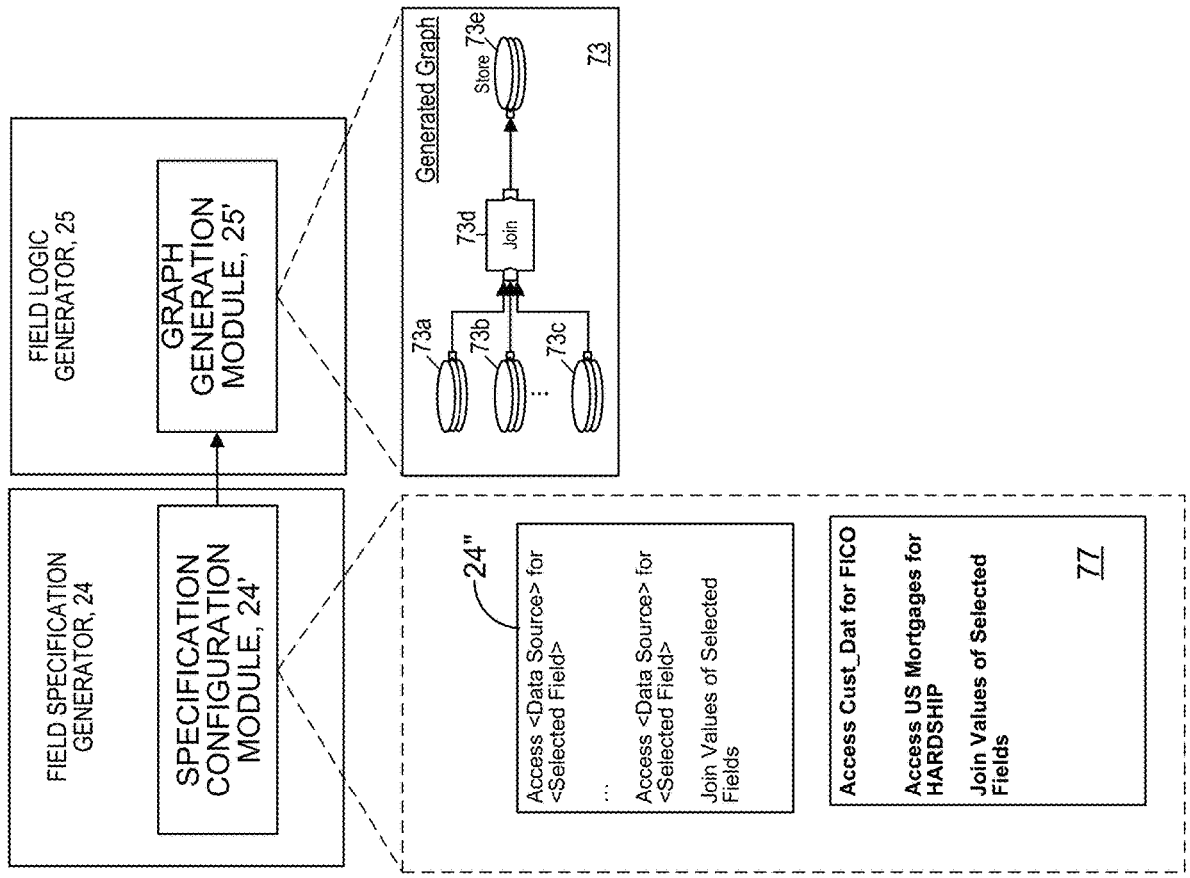

Referring to FIG. 4C, field specification generator 24 includes a specification configuration module 24' to generate specification 77, as described in U.S. Pat. No. 11,423,083 (entitled "TRANSFORMING A SPECIFICATION INTO A PERSISTENT COMPUTER PROGRAM"), the entire contents of which are incorporated herein by reference. Specification configuration module 24' stores template 24". Using selected data items 76 (as shown in FIG. 4B), field specification generator 24 populates the fields of template 24" to generate specification 77. In particular, specification configuration module 24' looks up in the data catalog the data sources that have the fields represented by the selected data items. Based on this look-up, field specification generator 24 receives metadata 75 (as shown in FIG. 4B) and transmits metadata 75 to specification configuration module 24', when then populates the fields in template 24" with the appropriate data source names and field names.

Field logic generator 25 includes graph generation module 25', which generates graph 73. Graph generation module 25' stores a template graph with access components, the output of which is connected to a join component, the output of which is connected to store component. Based on specification 77, graph generation module 25' generates graph 73 by configuring each of the access components to access the data sources specified in specification 77. Graph generation module 25' includes the logic to do so. As previously described, the specification 77 is also sent to the optimizer, which includes logic for adding filters to the specification 77 such that the input to the join component is only fields selected.

Figure 4D:
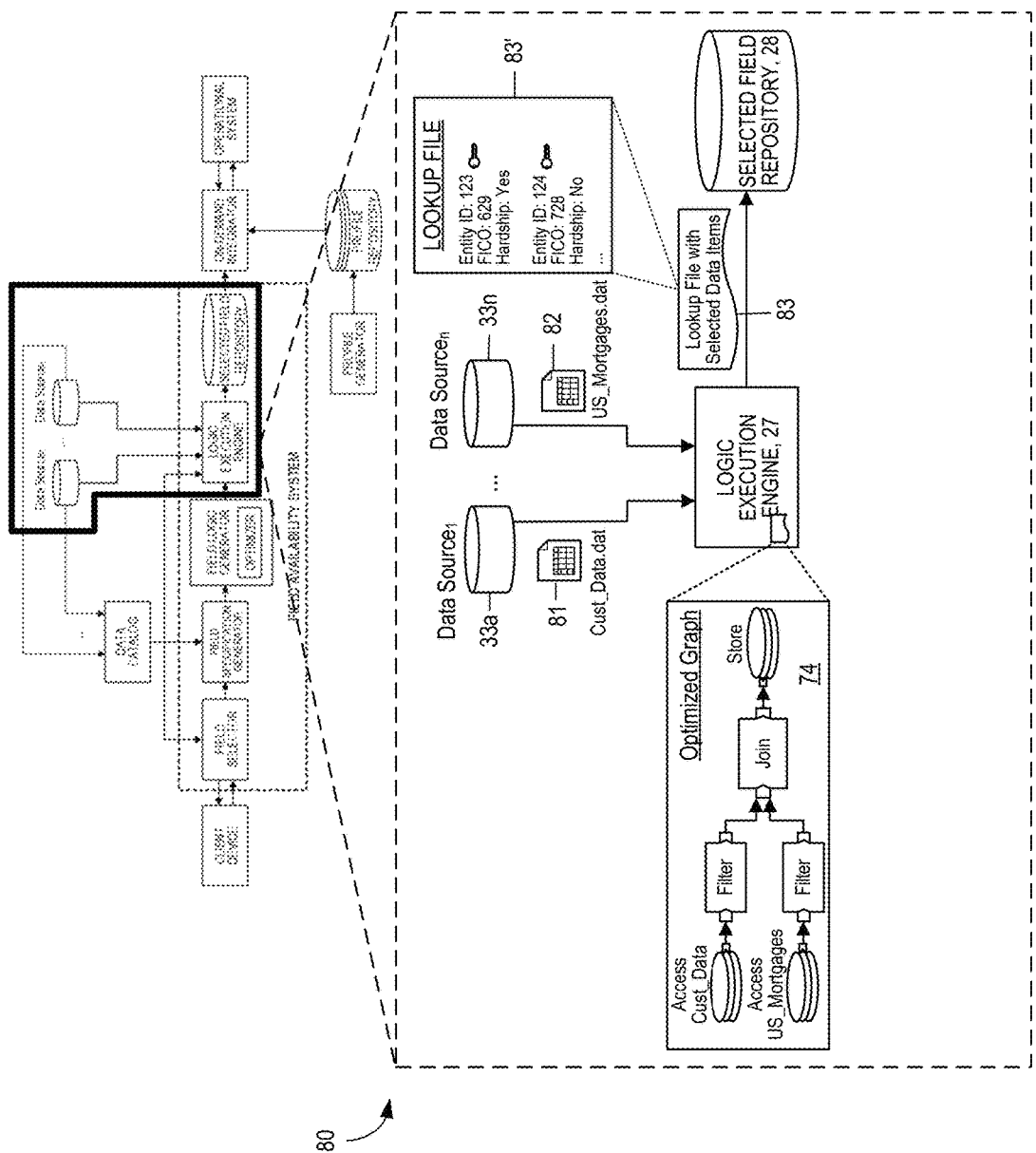

Referring to FIG. 4D, view 80 illustrates generation of lookup file 83'. In this example, logic execution engine executes optimized graph 74 to produce lookup file with selected data items 83 as shown in view 83'. In this example, based on execution of optimized graph 74, logic execution engine 27 retrieves data sets 81 and 82, and executes the logic specified in optimized graph 74 against these data sets 81, 82 to produce lookup file 83. In this example, lookup file 83 only includes the fields that were specified in portion 68 of graphical user interface 66. Additionally, lookup file 83 includes these fields for all entities across the system, that is, all entity IDs or keys for profiles that are being stored for the system. In this example, logic execution engine can be configured to generate graphs with improved efficiency, in addition to optimized graphs. For example, a graph with improved efficiency may be a graph that doesn't access data sources don't have selected data fields. In another example, an improved efficiency graph may add filter components to only join values for the selected fields.

Figure 4E:
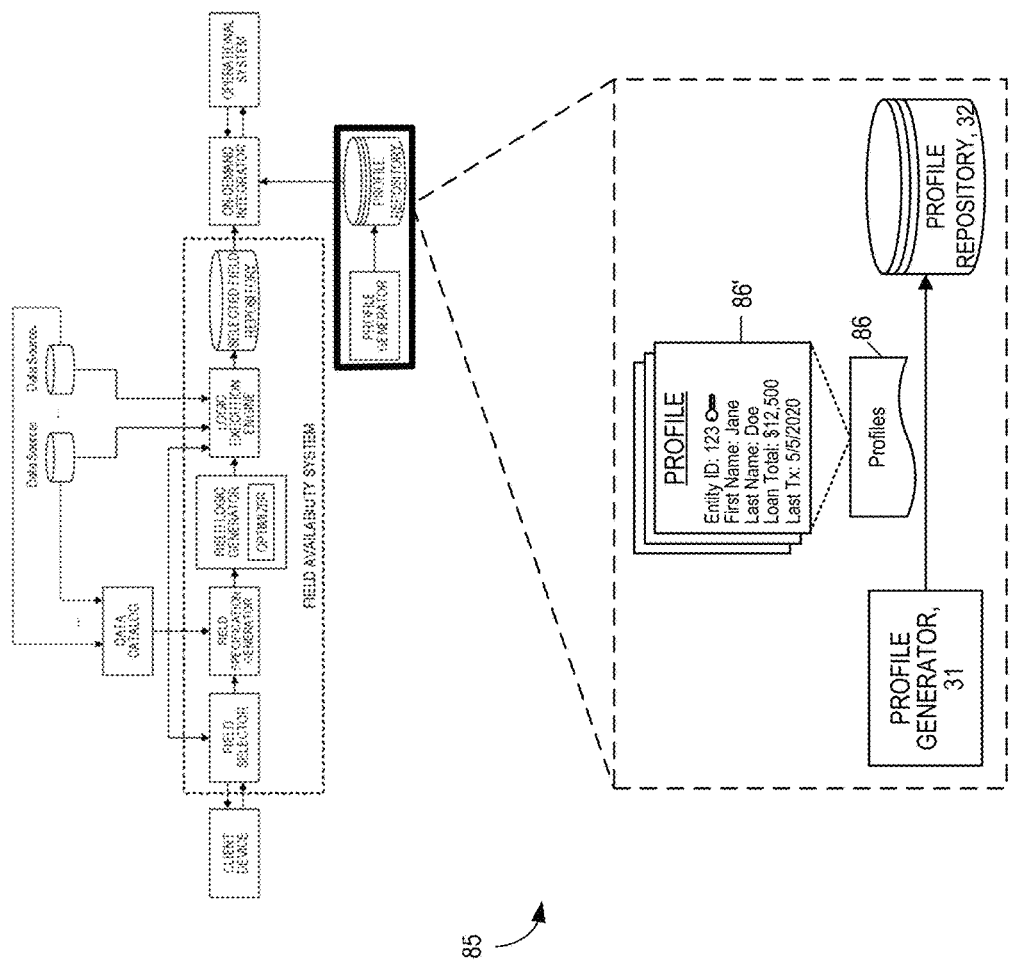

Referring to FIG. 4E, view 85 shows generation of profiles 86. In this example, profile generator 31 generates user profiles using commonly known techniques and transmits these user profiles 86 to profile repository 32. In this example, each of profiles 86, is a keyed data record. A keyed data record includes a data record or other structured data that is associated with a key [a unique identifier]. View 86' is of profiles 86.

Figure 4F:
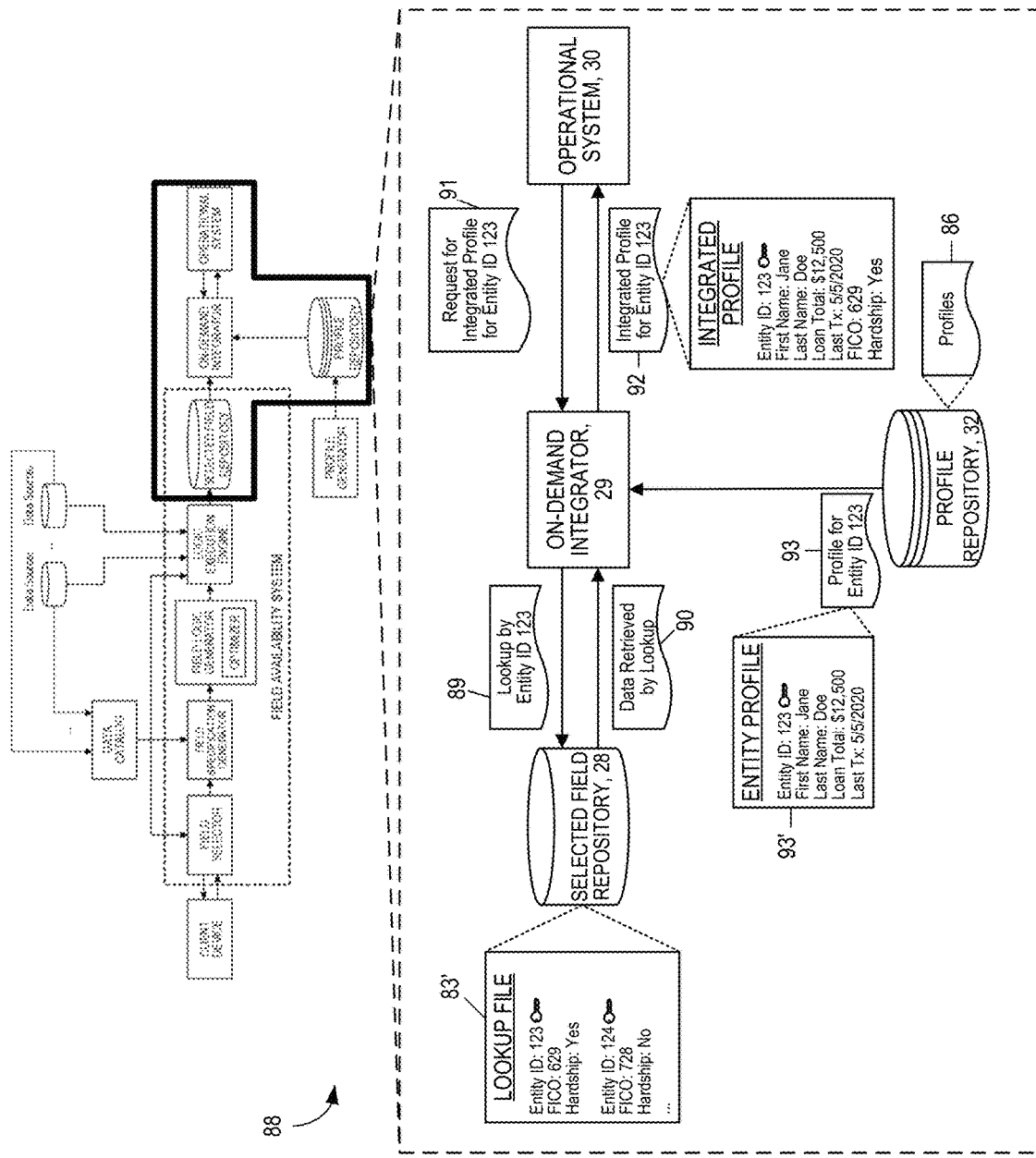

Referring to FIG. 4F, view 88 illustrates real-time and/or on-demand functionality of the system described herein. In this example, operational system 30 transmits request 91 to on-demand integrator 29. In this example, request 91 is a request for an entity profile associated with entity ID 123. Responsive to receiving request 91, on-demand integrator 29 transmits a lookup request 89 to selected field repository 28. In response, selected field repository 28 transmits data 90 to on-demand integrator 29. In this example, data 90 includes values of fields associated with entity ID 123. Additionally, profile repository 32 transmits profile 93 to on-demand integrator 29.

View 93' of entity profile 93 is shown. In this example, entity profile 93 is associated with entity ID 123. Entity ID 123 is a key value. On-demand integrator 29 integrates entity profile 93 with data 90 to output integrated profile 92 for entity ID 123. On-demand integrator 29 integrates entity profile 93 with data 90, for example by appending or otherwise joining data 90 with entity profile 93. Integrated profile 92 is output from on-demand integrator 29 and transmitted to operational system. Using the techniques described herein, a system efficiently integrates entity profiles with specified fields, by only performing the integration at the time of the demand.

Referring to FIG. 5, a process 100 is shown for generating an on-demand integrated profile. In operation, field availability system 21 stores (102), in memory, one or more attribute records, with each of the one or more attribute records specifying one or more attributes of an entity, and with each of the one or more attribute records being associated with one or more keys. Field availability system 21 accesses (103) a data catalog that stores identifiers representing fields, with the fields being candidates for inclusion in the one or more attribute records. Field availability system 21 receives (104) selection data that specifies one or more identifiers representing one or more fields selected for inclusion in the one or more attribute records. Based on the selection data, field availability system 21 identifies (105) the one or more fields represented by the one or more identifiers and identifying one or more data sources of the one or more fields. Field availability system 21 accesses (106) the one or more data sources to retrieve data associated with the one or more identified fields. Field availability system 21, based on the retrieved data, generates (107) a data structure that specifies: the one or more keys; and for each key of the one or more keys, the retrieved data. Field availability system 21 stores (108), in a hardware storage device, the data structure.

Dataflow graph components include data processing components and/or datasets. A dataflow graph can be represented by a directed graph that includes nodes or vertices, representing the dataflow graph components, connected by directed links or data flow connections, representing flows of work elements (i.e., data) between the dataflow graph components. The data processing components include code for processing data from at least one data input, (e.g., a data source) and providing data to at least one data output, (e.g., a data sink) of a system. The dataflow graph can thus implement a graph-based computation performed on data flowing from one or more input datasets through the graph components to one or more output datasets.

The system also includes a data processing system for executing one or more computer programs (such as dataflow graphs), which were generated by the transformation of a specification into the computer program(s) using a transform generator and techniques described herein. The transform generator transforms the specification into the computer program that implements the plurality of modules. In this example, the selections made by user through the user interfaces described here form a specification that specify which fields are to be added to the profile. Based on the specification, the transforms described herein are generated.

The data processing system may be hosted on one or more general-purpose computers under the control of a suitable operating system, such as the UNIX operating system. For example, the data processing system can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely distributed (e.g., multiple processors coupled via LAN or WAN networks), or any combination thereof.

The graph configuration approach described above can be implemented using software for execution on a computer. For instance, the software forms procedures in one or more computer programs that execute on one or more systems, e.g., computer programmed or computer programmable systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger computer program, for example, that provides other services related to the design and configuration of dataflow graphs. The nodes and elements of the graph can be implemented as data structures stored in a computer readable medium or other organized data conforming to a data model stored in a data repository.

The software may be provided on a non-transitory storage medium, such as a hardware storage device, e.g., a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the dataflow specified by the software are performed by different computers. Each such computer program is preferably stored on or downloaded to a non-transitory storage media or hardware storage device (e.g., solid state memory or media, or magnetic or optical media) readable by a general or special purpose programmable computer, for configuring and operating the computer when the non-transitory storage media or device is read by the system to perform the procedures described herein. The system may also be considered to be implemented as a computer-readable storage medium, configured with a computer program, where the storage medium so configured causes the system to operate in a specific and predefined manner to perform the functions described herein.

Example Computing Environment

Figure 6:
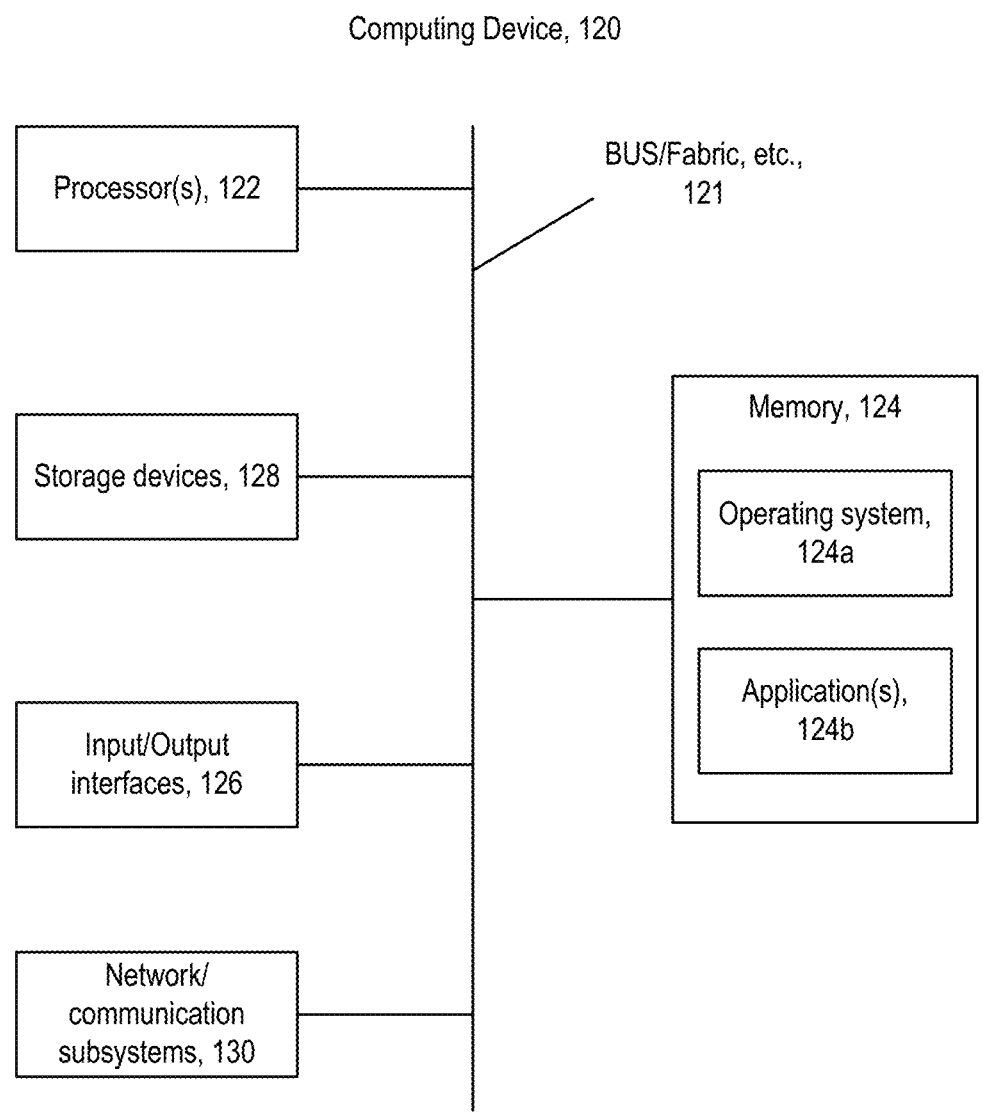
FIG. 6 is a diagram showing details of a computer system, such as a data processing system.

Referring to FIG. 6, an example operating environment for implementing embodiments of the present invention is shown and designated generally as computing device 120. Essential elements of a computing device 120 or a computer or data processing system or client or server are one or more programmable processors 122 for performing actions in accordance with instructions and one or more memory devices 124 for storing instructions and data. Generally, a computer will also include, or be operatively coupled, (via bus 121, fabric, network, etc.) to I/O components 126, e.g., display devices, network/communication subsystems, etc. (not shown) and one or more mass storage devices 128 for storing data and instructions, etc., and a network communication subsystem 130, which are powered by a power supply (not shown). In memory 124, are an operating system 124*a* and applications 124*b* for application programming.

Devices suitable for storing computer program instructions and data include all forms of non-volatile memory, media and memory devices including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification are implemented on a computer having a display device (monitor) for displaying information to the user and a keyboard, a pointing device, (e.g., a mouse or a trackball) by which the user can provide input to the computer. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the user device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the techniques described herein. For example, some of the steps described above may be order independent, and thus can be performed in an order different from that described. Additionally, any of the foregoing techniques described with regard to a dataflow graph can also be implemented and executed with regard to a program. Accordingly, other embodiments are within the scope of the following claims.

What is claimed is:

1. A method implemented by a data processing system for enabling a user to browse a data catalog and select fields from multiple data sources to be integrated into an attribute record so that, when a request is received for the attribute record, data from those fields is made available, including:
   storing, in memory, one or more attribute records, with each of the one or more attribute records specifying one or more attributes of an entity, and with each of the one or more attribute records being associated with one or more keys;
   accessing a data catalog that stores identifiers representing fields of datasets in one or more data sources, with the fields being candidates for inclusion in the one or more attribute records;
   based on accessing the data catalog, receiving selection data that specifies one or more identifiers representing one or more fields selected for inclusion in the one or more attribute records;
   based on the selection data, identifying the one or more fields selected represented by the one or more identifiers and identifying one or more data sources of the one or more fields selected;
   accessing the one or more data sources to retrieve data associated with the one or more fields selected;
   based on the retrieved data, generating a data structure that specifies:
   the one or more keys; and
   for each key of the one or more keys, the retrieved data and the one or more identifiers representing the one or more fields selected for inclusion in the one or more attribute records; and
   storing, in a hardware storage device, the data structure;
   wherein, when a request for a given attribute record associated with a given key is received, the generated data structure enables the given attribute record to include:
   retrieved data for the given key, and
   the one or more identifiers representing the one or more fields selected.

2. The method of claim 1, wherein the data from those fields is made available efficiently and immediately.

3. The method of claim 1, further including:
   receiving a request for an attribute record associated with a given key of the one or more keys;
   responsive to the request, retrieving, from the data structure, the one or more identifiers and one or more items of the retrieved data associated with the given key;
   accessing, in the memory, the attribute record associated with the given key;
   updating the attribute record associated with the given key, with the attribute record being updated with the one or more identifiers and the one or more items of the retrieved data associated with the given key; and
   storing, in the memory, the updated attribute record.

4. The method of claim 1, further including:
   causing rendering of a graphical user interface that when rendered in a display device displays one or more first visual representations of the one or more identifiers and one or more controls, selection of which requests to add a field represented by a given identifier to an attribute record.

5. The method of claim 1, further including:
   generating an executable program to retrieve, from the one or more data sources, and join together the data associated with the one or more identified fields; and
   executing the executable program to generate the data structure based on the retrieved and joined data.

6. The method of claim 5, wherein generating the executable program includes:
   accessing a template of an executable program, wherein the template specifies to access a plurality of data sources represented in the data catalog; and
   updating the template such that the template is configured to only access one or more data sources storing data associated with the one or more identified fields;
   wherein the updating improves a run-time efficiency of an executable program generated from the updated template, relative to a run-time efficiency of an executable program generated from the template.

7. The method of claim 6, wherein updating includes adding one or more filter operations such that the executable program, when executed, only joins data associated with the one or more identified fields.

8. The method of claim 6, wherein updating includes omitting one or more data access operations for one or more data sources storing data associated with one or more fields that are different from the one or more identified fields.

9. A data processing system configured for enabling a user to browse a data catalog and select fields from multiple data sources to be integrated into an attribute record so that, when a request is received for the attribute record, data from those fields is made available, the data processing system including:
   one or more processors; and a memory device storing instructions that, when executed by the one or more processors, cause the one or more processors to perform operations including:

storing, in a memory, one or more attribute records, with each of the one or more attribute records specifying one or more attributes of an entity, and with each of the one or more attribute records being associated with one or more keys;

accessing a data catalog that stores identifiers representing fields of datasets in one or more data sources, with the fields being candidates for inclusion in the one or more attribute records;

based on accessing the data catalog, receiving selection data that specifies one or more identifiers representing one or more fields selected for inclusion in the one or more attribute records;

based on the selection data, identifying the one or more fields selected represented by the one or more identifiers and identifying one or more data sources of the one or more fields selected;

accessing the one or more data sources to retrieve data associated with the one or more fields selected;

based on the retrieved data, generating a data structure that specifies:
the one or more keys; and
for each key of the one or more keys, the retrieved data and the one or more identifiers representing the one or more fields selected for inclusion in the one or more attribute records; and storing, in a hardware storage device, the data structure;

wherein, when a request for a given attribute record associated with a given key is received, the generated data structure enables the given attribute record to include:
retrieved data for the given key, and
the one or more identifiers representing the one or more fields selected.

10. The data processing system of claim 9, wherein the data from those fields is made available efficiently and immediately.

11. The data processing system of claim 9, the operations further including:
receiving a request for an attribute record associated with a given key of the one or more keys;
responsive to the request, retrieving, from the data structure, the one or more identifiers and one or more items of the retrieved data associated with the given key;
accessing, in the memory, the attribute record associated with the given key;
updating the attribute record associated with the given key, with the attribute record being updated with the one or more identifiers and the one or more items of the retrieved data associated with the given key; and
storing, in the memory, the updated attribute record.

12. The data processing system of claim 9, the operations further including:
causing rendering of a graphical user interface that when rendered in a display device displays one or more first visual representations of the one or more identifiers and one or more controls, selection of which requests to add a field represented by a given identifier to an attribute record.

13. The data processing system of claim 9, the operations further including:
generating an executable program to retrieve, from the one or more data sources, and join together the data associated with the one or more identified fields; and executing the executable program to generate the data structure based on the retrieved and joined data.

14. The data processing system of claim 13, wherein generating the executable program includes:
accessing a template of an executable program, wherein the template specifies to access a plurality of data sources represented in the data catalog; and
updating the template such that the template is configured to only access one or more data sources storing data associated with the one or more identified fields,
wherein the updating improves a run-time efficiency of an executable program generated from the updated template, relative to a run-time efficiency of an executable program generated from the template.

15. The data processing system of claim 14, wherein updating includes adding one or more filter operations such that the executable program, when executed, only joins data associated with the one or more identified fields.

16. The data processing system of claim 15, wherein updating includes omitting one or more data access operations for one or more data sources storing data associated with one or more fields that are different from the one or more identified fields.

17. One or more non-transitory computer readable media storing instructions for being executed by one or more processors of a data processing system, the instructions configured for enabling a user to browse a data catalog and select fields from multiple data sources to be integrated into an attribute record so that, when a request is received for the attribute record, data from those fields is made available, the instructions causing, when executed, the one or more processors to perform operations including:

storing, in a memory, one or more attribute records, with each of the one or more attribute records specifying one or more attributes of an entity, and with each of the one or more attribute records being associated with one or more keys;

accessing a data catalog that stores identifiers representing fields of datasets in one or more data sources, with the fields being candidates for inclusion in the one or more attribute records;

based on accessing the data catalog, receiving selection data that specifies one or more identifiers representing one or more fields selected for inclusion in the one or more attribute records;

based on the selection data, identifying the one or more fields selected represented by the one or more identifiers and identifying one or more data sources of the one or more fields selected;

accessing the one or more data sources to retrieve data associated with the one or more fields selected;

based on the retrieved data, generating a data structure that specifies:
the one or more keys; and
for each key of the one or more keys, the retrieved data and the one or more identifiers representing the one or more fields selected for inclusion in the one or more attribute records; and storing, in a hardware storage device, the data structure;

wherein, when a request for a given attribute record associated with a given key is received, the generated data structure enables the given attribute record to include:
retrieved data for the given key, and
the one or more identifiers representing the one or more fields selected.

18. The one or more non-transitory computer readable media of claim 17, wherein the data from those fields is made available efficiently and immediately.

19. The one or more non-transitory computer readable media of claim 17, the operations further including:
  receiving a request for an attribute record associated with a given key of the one or more keys;
  responsive to the request, retrieving, from the data structure, the one or more identifiers and one or more items of the retrieved data associated with the given key;
  accessing, in the memory, the attribute record associated with the given key;
  updating the attribute record associated with the given key, with the attribute record being updated with the one or more identifiers and the one or more items of the retrieved data associated with the given key; and
  storing, in the memory, the updated attribute record.

20. The one or more non-transitory computer readable media of claim 17, the operations further including:
  causing rendering of a graphical user interface that when rendered in a display device displays one or more first visual representations of the one or more identifiers and one or more controls, selection of which requests to add a field represented by a given identifier to an attribute record.

21. The one or more non-transitory computer readable media of claim 17, the operations further including:
  generating an executable program to retrieve, from the one or more data sources, and join together the data associated with the one or more identified fields; and
  executing the executable program to generate the data structure based on the retrieved and joined data.

22. The one or more non-transitory computer readable media of claim 21, wherein generating the executable program includes:
  accessing a template of an executable program, wherein the template specifies to access a plurality of data sources represented in the data catalog; and
  updating the template such that the template is configured to only access one or more data sources storing data associated with the one or more identified fields,
  wherein the updating improves a run-time efficiency of an executable program generated from the updated template, relative to a run-time efficiency of an executable program generated from the template.

23. The one or more non-transitory computer readable media of claim 22, wherein updating includes adding one or more filter operations such that the executable program, when executed, only joins data associated with the one or more identified fields.

24. The one or more non-transitory computer readable media of claim 23, wherein updating includes omitting one or more data access operations for one or more data sources storing data associated with one or more fields that are different from the one or more identified fields.

* * * * *